United States Patent [19]
Browning

[11] Patent Number: 6,081,629
[45] Date of Patent: Jun. 27, 2000

[54] HANDHELD SCANNER AND ACCOMPANYING REMOTE ACCESS AGENT

[76] Inventor: Denton R. Browning, 2405 Lakeshire Dr., Alexandria, Va. 22308

[21] Appl. No.: 08/931,885

[22] Filed: Sep. 17, 1997

[51] Int. Cl.[7] .............................. G06K 9/22; H04N 1/024
[52] U.S. Cl. ............................................. 382/313; 358/473
[58] Field of Search ................................... 382/313, 314, 382/317; 358/473, 440, 442, 527, 474, 403; 235/472, 473; 396/319, 429, 564; G06K 9/22

[56] References Cited

U.S. PATENT DOCUMENTS

| | | | |
|---|---|---|---|
| 4,947,261 | 8/1990 | Ishikawa et al. | 358/473 |
| 5,083,218 | 1/1992 | Takasu et al. | 358/473 |
| 5,301,243 | 4/1994 | Olschafskie et al. | 382/313 |
| 5,574,804 | 11/1996 | Olschafskie et al. | 382/313 |
| 5,595,445 | 1/1997 | Bobry | 358/473 |
| 5,663,808 | 9/1997 | Park | 358/440 |
| 5,799,219 | 8/1998 | Moghadam et al. | 396/319 |
| 5,837,987 | 11/1998 | Koenck et al. | 235/462 |

*Primary Examiner*—Cheukfan Lee
*Attorney, Agent, or Firm*—Burns, Doane, Swecker & Mathis, L.L.P.

[57] ABSTRACT

A handheld device scans single line textual information in the form of internet URL'S, internet protocol addresses, internet e-mail addresses, FTP sites, USENET news group addresses and DNS addresses as they occur in print advertising and printed media. Scanned textual data is processed with OCR technology and displayed for user verification. The device utilizes onboard memory to store information until such time it can be transmitted via wireless communications to a companion software communications agent executing on a personal computer, network computer, PIN computing device or electronic newspaper. The software communications agent utilizes a connection to the internet to retrieve HTML/VRML documents, e-mail messages, USENET news, Java applets, ActiveX documents, or file transfers from the internet location interpreted by the handheld scanner/OCR device.

18 Claims, 5 Drawing Sheets

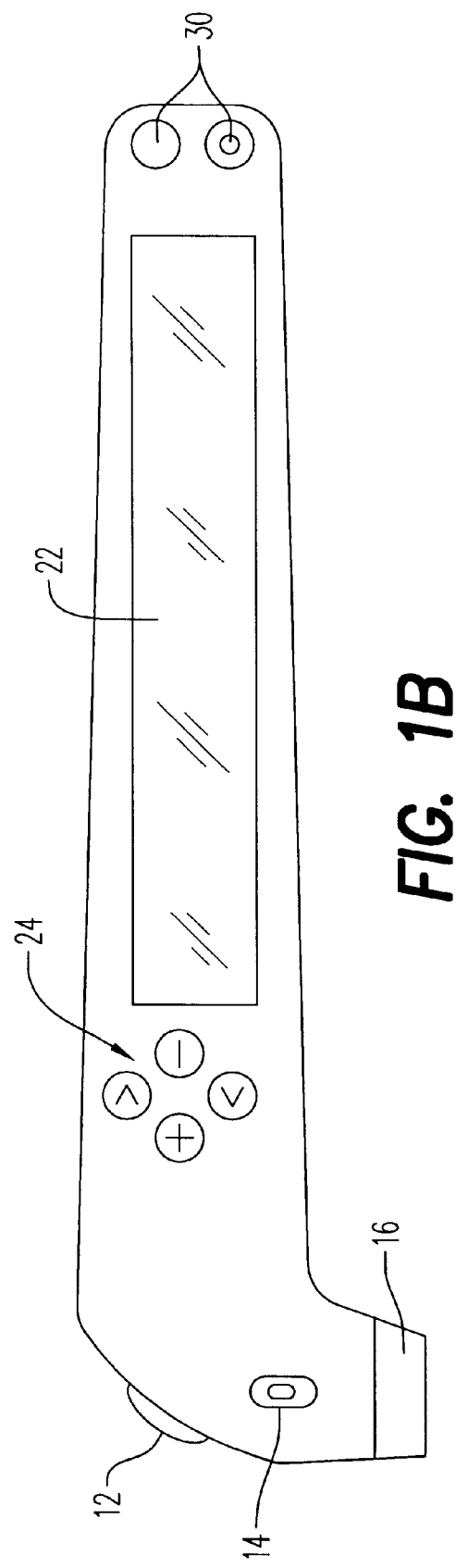
FIG. 1A
FIG. 1B

HANDHELD SCANNER AND ACCOMPANYING REMOTE ACCESS AGENT

BACKGROUND OF INVENTION

Most handheld scanners used for acquiring information from printed media are directed to general purpose uses, so that they can read and store a variety of different types of printed information designed for various applications. Recent developments directed to these general purpose scanners concern themselves with eliminating distortion before sending images for processing on other devices. Because of storage requirements of images, most scanners utilize plug-in modules to store images, or are limited to small numbers of images before transmission is necessary. This invention is directed to a more special-purpose type of scanner system which comprises the combination of a handheld scanner and associated software communications agent. The scanner is capable of scanning a single line of text and presenting that text to an onboard OCR engine, allowing user display and verification before information is sent to the companion software communications agent. One specific application of the present invention is the scanning of the printed address, or other identification, of a site that is accessible via a communications network such as the internet, and subsequent connection of a communications device to that site. To this end, the invention relates to a method of scanning, verification, storage and transmission of textual data to a companion software communications agent for the utilization of scanned data for connection to a site identified by the textual data. Specifically the invention relates to a system comprising the unique combination of scanner, optical character recognition technology, liquid crystal display and wireless infrared transmission embodied in a handheld apparatus for the purpose of scanning one line of textual information, processing the scanned information with OCR technology and immediately displaying the information to the LCD panel for user verification. This handheld scanner/OCR apparatus allows the verified text to be transmitted to the companion software communications agent on a personal computer (PC) or network computer (NC) which communicates via the internet, e.g. through a browser program, for the retrieval of HTML or VRML documents, or other such information.

SUMMARY

The objective of this invention contemplates a handheld device that will scan single line textual information in the form of internet URL's, internet protocol addresses, internet e-mail addresses, FTP sites, USENET news group addresses and DNS addresses as they occur in print advertising and printed media. Scanned textual data is processed with OCR technology and displayed for user verification. The device utilizes onboard memory to store information until such time as it can be transmitted via wireless communications to a companion software communications agent executing on a communications device such as a personal computer, network computer, PIN computing device or electronic newspaper.

The software communications agent utilizes a connection to the internet to send/retrieve HTML/VRML documents, e-mail messages, USENET news, Java applets, ActiveX documents, or file transfers to/from the internet location interpreted by the handheld scanner/OCR device.

BRIEF DESCRIPTION OF THE FIGURES

FIGS. 1A and 1B are a top view and side view, respectively, of a handheld scanner according to the present invention;

DETAILED DESCRIPTION

Generally speaking, the present invention is comprised of two main components, namely (1) a handheld scanner/OCR device which is used to read and process a limited amount of textual information that identifies a site which is remotely accessible via electronic communications, such as a Uniform Resource Location (URL) or an e-mail address, and (2) a companion software communications agent which is an executable program that runs on a communications device and which receives the information processed by the scanner and establishes a connection to the remote site.

Figure 2:
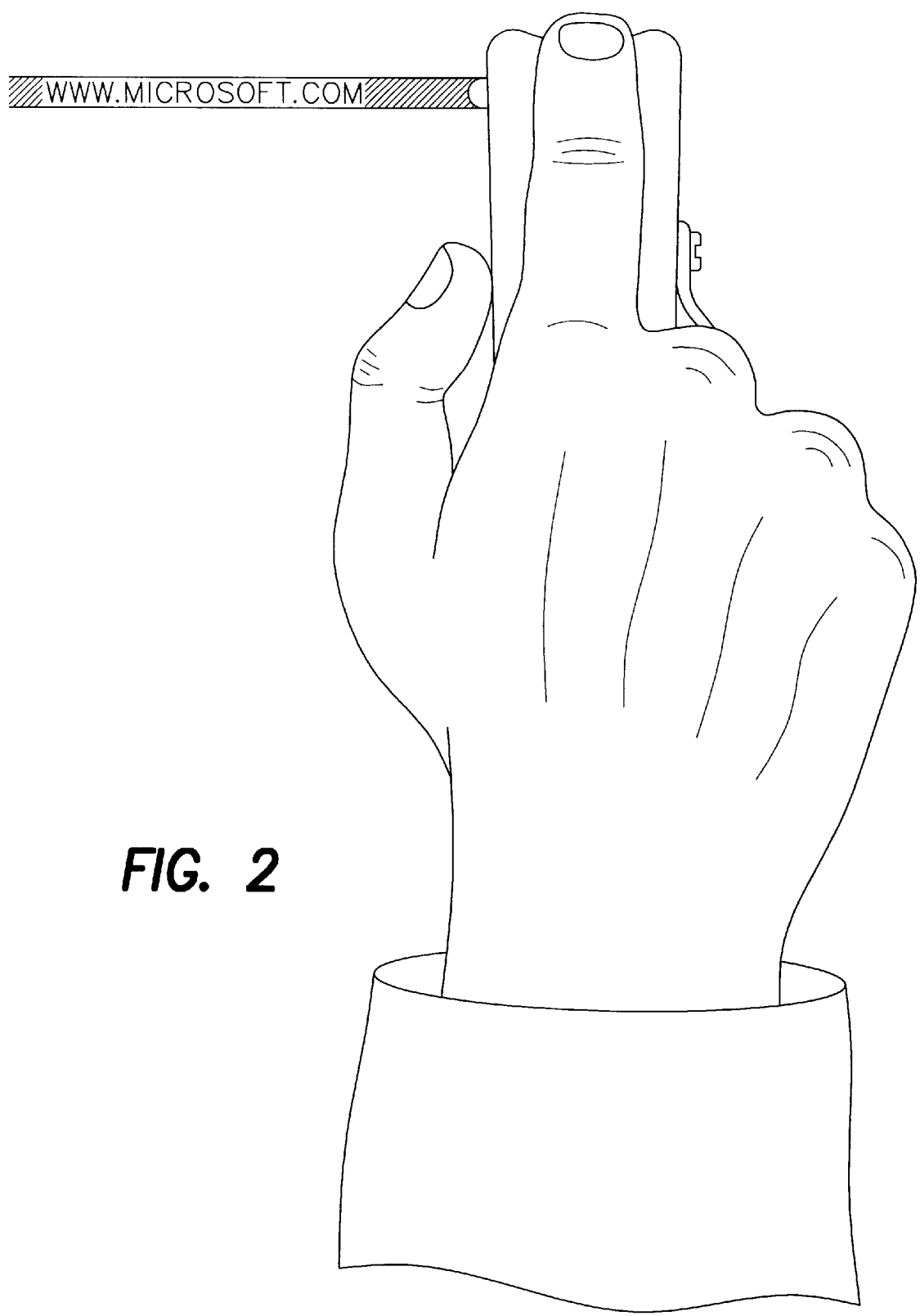
FIG. 2 is a view of the scanner in use.
Figure 3:
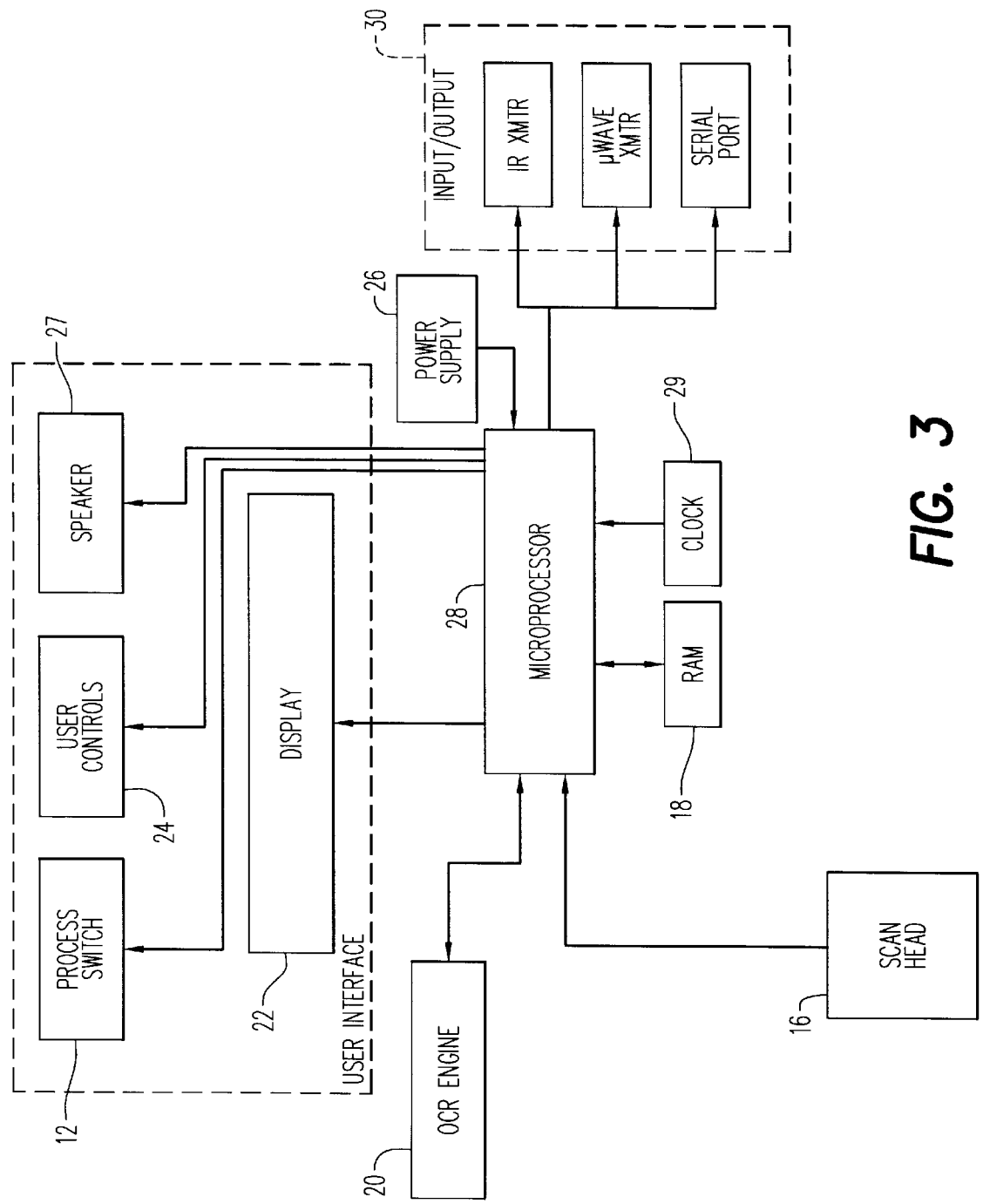
FIG. 3 is a block diagram of the components which make up the handheld scanner.

Illustrated in FIGS. 1A, 1B and 3 are the basic components which constitute the handheld scanner portion of this invention. In the embodiment of FIGS. 1A and 1B, the scanner comprises a housing 10 constructed of plastic and/or composites that form a rigid structure which will withstand normal forces of usage. Located on the exterior of the handheld scanner/OCR device is a process switch 12 which initiates the start and end of a scan sequence. The scan is performed by sweeping the handheld scanner/OCR device across printed media containing information of interest, such as an URL. The scanning motion is aided by an aiming an alignment strip of laser light emitted from a laser diode 14, or the like. Referring to FIG. 2, the scanner is oriented so that the beam of light emitted by the laser diode is aligned along a line of text displayed on printed media, to assure proper juxtaposition of the text relative to a scan head 16 at one end of the housing. In the illustrated embodiment, the laser diode is positioned on the left side of the housing, to facilitate right-to-left scanning. Alternatively, or in addition, a laser diode can be located on the right side of the housing, for left-to-right movement of the scanner. The scan head 16 consists of a CCD array of light sensing elements and a lens which uses ambient light to convert the optical image of the scanned text to electrical signals on a pixel-by-pixel basis.

Referring now to FIG. 3, a block diagram of the components of the handheld scanner is shown. The electrical signals generated by the CCD in the scan head 16 are stored in a RAM 18 as a complete image. The text imaged is passed to an OCR engine, residing on a PROM 20. Since the scanner is preferably designed to read and store limited types of information, the OCR engine can be optimized by using a limited dictionary to convert the scanned images to alphanumeric character strings. For instance, if the scanner is intended to be used only for URLs and e-mail addresses, the dictionary might store only the information necessary to recognize the lowercase letters and symbols that are employed in these types of identifiers. As the character strings are recognized by the OCR engine, they are immediately displayed on an integrated LED/LCD display 22 for the operator to verify a correct scan via externally accessible operator controls 24. The user controls 24 also permit the user to scroll through the display, if the number of characters is larger than that which can be shown on the display at one time. If the scan is correct, the user actuates an appropriate one of the controls, and the character string is stored in the RAM 18, for subsequent transmission to a companion software communications agent. Preferably, the RAM is of the non-volatile type, so that stored data is not lost even if an on-board power supply 26 should fail. If the scan is incorrect, through the use of the externally accessible operator controls 24 the character string is deleted and the apparatus is reset for re-scan. Thus, the user is able to immediately verify whether the printed text has been properly scanned and recognized, and take corrective action if necessary. Further in this regard, the scanner can include a speaker 27, or the like, which provides audible feedback to the user to indicate when the scanner is ready to begin a scan after the process switch 12 has been actuated, and/or to indicate when the results of a scan are so poor that the input image cannot be reliably converted to text, e.g. the scanner was skewed relative to the line of printed text.

The scan head, OCR engine and other integrated circuits are controlled by means of a microprocessor 28 which is programmed with instructions to carry out the functions described herein. Many suitable microprocessors are available in the commercial marketplace to meet this need. To facilitate later cataloguing and retrieval of scanned addresses, the scanner can include a clock 29 which the microprocessor employs to stamp each stored entry with an associated date and time, which information is also transmitted to the communications agent.

The handheld scanner also contains one or more I/O ports 30, that permit the stored character data to be transferred to a computer, or other type of communications device. The user controls 24 allow the operator to transmit the data, using an infrared or RF transmitter, to a companion software communications agent executing on a personal computer, network computer, electronic newspaper, television set-top box, or other type of communications device. The companion software communications agent allows the user to the view textual address information and group by relevance, date and time, priority, or topic. Once initiated, the companion software communications agent utilizes an internet or other network connection to search for the textual addresses interpreted by the handheld scanner/OCR device and presented to the companion software communications agent, and retrieves HTML/VRML documents, e-mail messages, USENET news, Java applets, ActiveX documents, or file transfers from the internet address locations.

Figure 4:
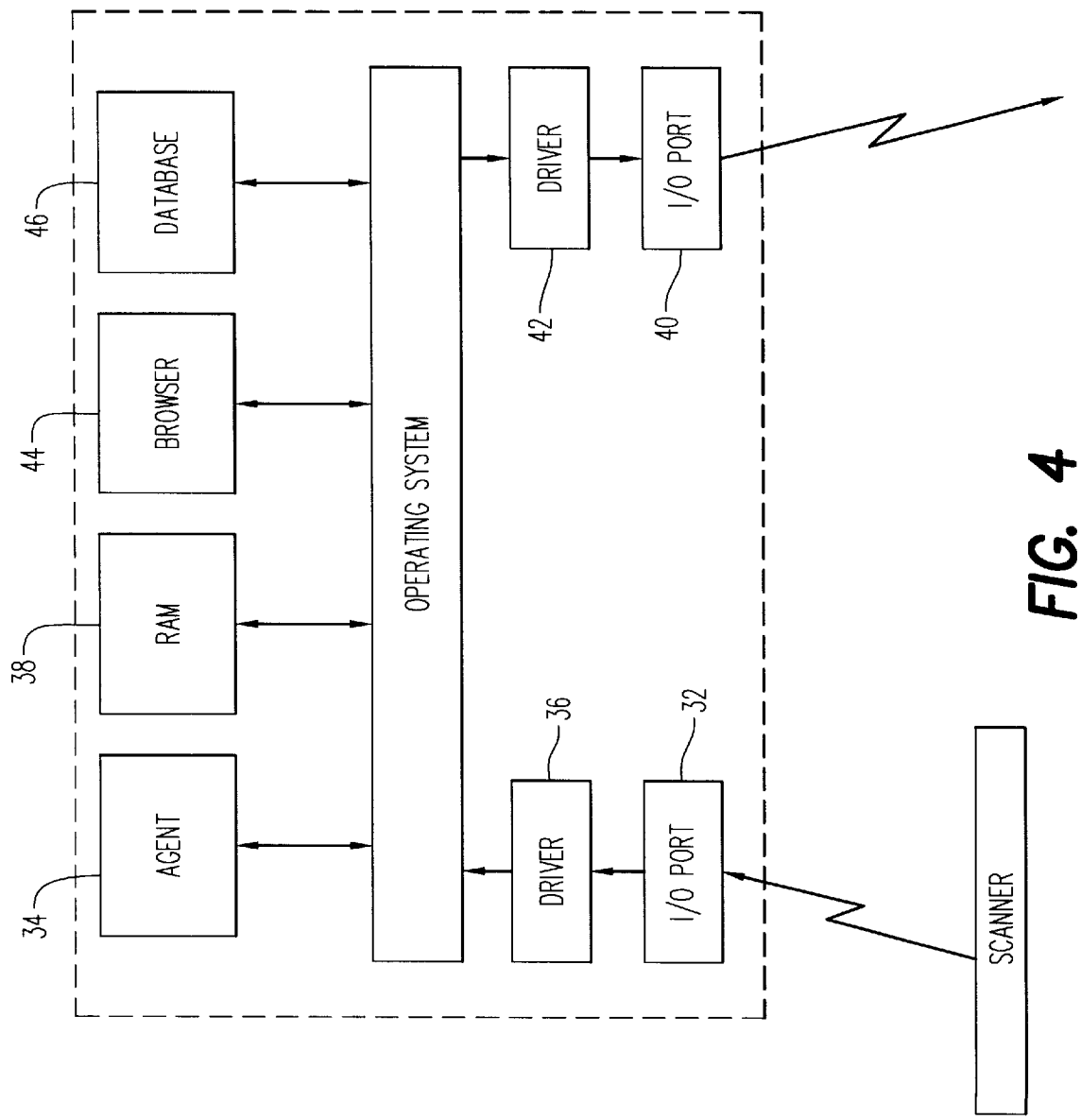
FIG. 4 is a block diagram of the architecture of the software system for a typical communications device on which the software communications agent is executing.
Figure 5:
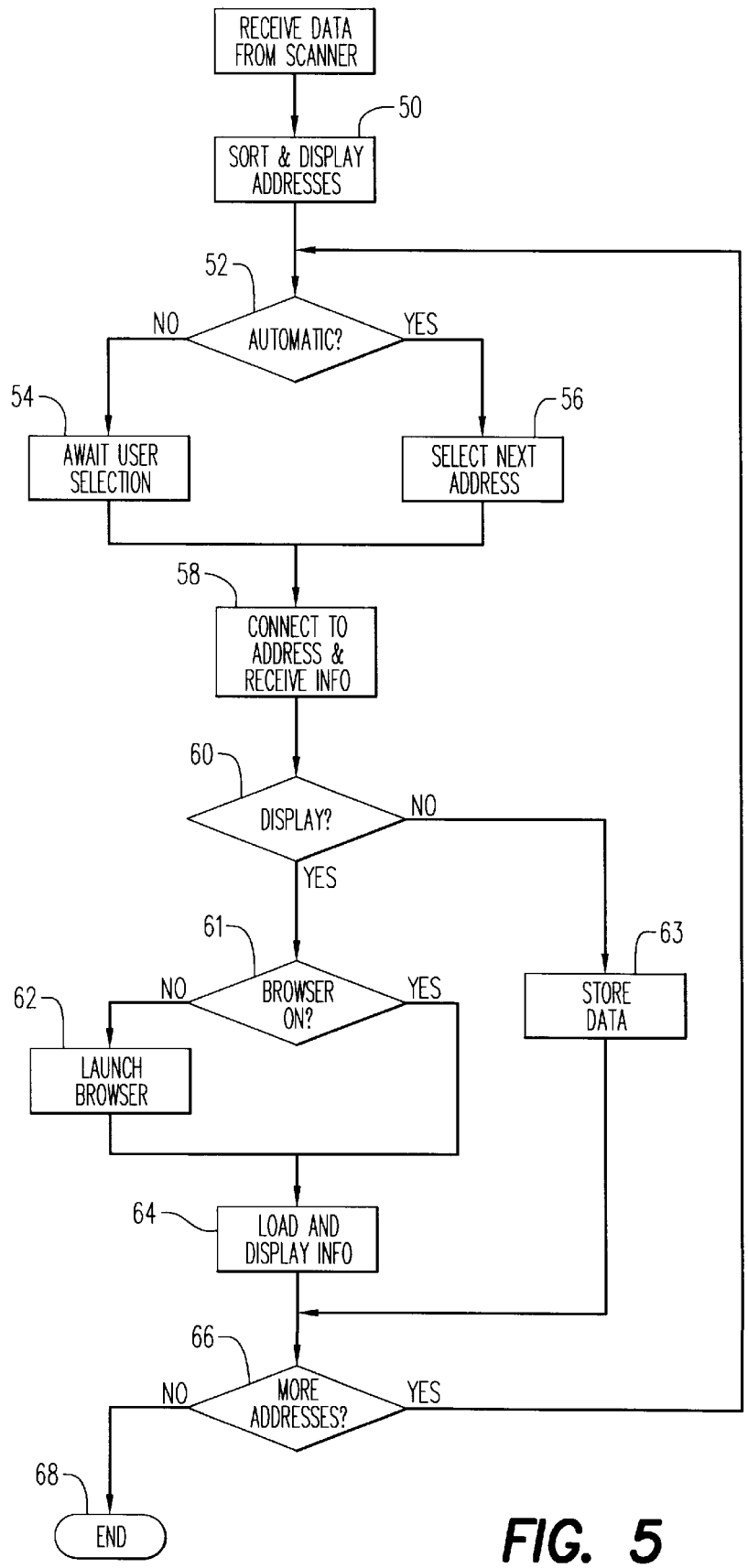
FIG. 5 is a flowchart depicting the operation of the software communications agent.

Referring now to FIGS. 4 and 5, the basic operation of the software communications agent will be described. After verifying that the printed text has been properly scanned and converted into character data by the handheld scanner, the user activates one of the control buttons 24 on the exterior of the scanner to transmit the character data to a suitable communications device that is connectable to the internet or other communications network. In one embodiment, the communications device might be a personal computer or network node. In other implementations, the communications device might be a television set-top box which provides internet connection capabilities, or a handset for a personal communication system (PCS). The transmitted data is downloaded to the communications device through a suitable I/O port 32. The I/O port 32 is one which is capable of receiving data in the format transmitted by the corresponding I/O port 30 on the scanner. Thus, if data is transmitted using a wireless medium, such as IR light or RF signals, the port 32 is capable of receiving and interpreting such signals. Alternatively, if the I/O port 30 is a serial port, the corresponding port provides a hardwired link to the scanner, either directly or via a cable. The data received at the port 32 is passed on to a software communications agent 34 executing on the computer, via a suitable I/O driver 36, and stored in the computer's random access memory 38.

Preferably, the scanner has sufficient memory capabilities to store multiple addresses. Referring to FIG. 5, the addresses are sorted by the agent 34 at step 50, pursuant to any criteria established by the user, and displayed for viewing on the computer's monitor, or the like. For example, the user may set a preference item to indicate that the addresses should be sorted in the order in which they are received from the scanner, which might correspond to the order in which they were originally scanned and time-stamped by the scanner. Alternatively, they could be sorted in alphabetical order, or according to any other user-selectable criteria.

Once the addresses have been received from the scanner, the software agent initiates a connection to a remote site, such as a world-wide web page on the internet, via another I/O port 40 having an associated driver 42. When initiating the connection, the software agent 34 can operate in either an automatic mode or a user-controlled mode. In the automatic mode, the agent controls the driver 42 to automatically establish a connection to a remote site whose address has been received from the scanner. In the user-controlled mode, the agent awaits input from the user before causing the connection to be established. At step 52, therefore, a determination is made whether the user has placed the agent in the automatic or user-controlled mode. If the automatic mode has not been selected, the agent awaits input from the user at step 54, namely the selection of one of the displayed addresses and a command to establish a connection to that address. Conversely, if the automatic mode has been selected, the first address in the sorted list is selected at step 56, and a connection is made to the remote site at that address, at step 58. To do so, the software agent can run a script file, or the like, which launches the driver 42 and any other appropriate resources in the communications device to establish the appropriate connection. For example, in a personal computer, these resources might include a dial-up network facility if communications are to be established via a modem and telephone line.

Once the connection is established, the relevant information at the remote site is downloaded and stored in the communications device. For example, if the address pertains to a world-wide web site on the internet, the downloaded information might comprise an HTML or VRML document, or an applet in a platform-independent programming language, such as Java. Conversely, if the remote site is an e-mail server, the retrieved information can be e-mail messages which have been addressed to the user of the communications device.

The software agent can operate in either of two modes. In a playback mode, the retrieved information is displayed to the user immediately upon receipt. In a storage mode, the retrieved information is stored for later viewing by the user at a time that may be more convenient. After the relevant information has been downloaded from the remote site, therefore, a determination is made at step 60 whether the agent is in the playback mode. If so, a check is made at step 61 whether a browser program 44, or other program for viewing and/or editing the downloaded data, is currently running. If not, the program is launched at step 62, and the downloaded information is then loaded into the application program and displayed to the user, at step 64.

If the agent is not operating in the playback mode at step 60, the retrieved data is stored on a hard disk or other local storage media, at step 63. If desired, the agent can issue a command to automatically store the address as a bookmark, so the user can easily connect to that site at a later time. Thus, with very minimal effort, the user is able to transfer an address from printed media to a communications device, and establish a connection to a remote site identified by the address to download relevant information from that site. If the user does not desire to view the downloaded information at that time, the agent can be configured to simply store the information at a designated location in a local non-volatile memory, for later retrieval and display. In this case, there is no need to launch the browser, or any other application program, as an immediate response to the downloading of the information.

After the information from the first site has been downloaded for display and/or storage, a determination is made at step 66 whether additional addresses remain on the display list. If so, the process returns to step 52, and either automatically connects to the next site on the list, or awaits further user input regarding the next address to which a connection should be made, depending on the operating mode. The process continues in this fashion, to establish a connection to each address which has been received from the handheld scanner, and download the relevant information from that address, to be immediately displayed to the user, and/or stored for subsequent retrieval and display. After a connection has been made to every address on the list, the process terminates at step 68.

It will be appreciated by those of ordinary skill in the art that the present invention can be embodied in other specific forms without departing from the spirit or essential characteristics thereof. For example, in the preceding description, the software communications agent itself establishes the connection to the remote site, and then presents the downloaded information to a browser program for viewing. As an alternative, the agent can simply launch the browser and provide the character data to the browser in a manner analogous to user input from a keyboard. In this case, the browser itself establishes the connection to the remote site and downloads the information, in the conventional manner.

In the arrangement illustrated in FIG. 4, the agent 34 is shown as being a program which is separate from the browser program. In an alternative implementation of the invention, the functionality of the software agent can be incorporated into a browser or other application program itself. In this implementation, the browser receives the character data directly from the scanner as a URL, and establishes a connection in the usual manner.

The preceding explanation of the invention was presented in the context in which information is downloaded from each remote site identified by the scanned text. The communications agent can also be configured to automatically upload information, such as a pre-designated file, to the addresses which are provided by the scanner.

In another embodiment of the invention, the scanned data need not be text, i.e. printed characters. Rather, it can be some other form of identification, such as the universal product codes, e.g. bar codes, that are found on many consumer items. In this case, the communications device stores a database 46 that is associated with the software agent. This database contains an URL, or similar such address data, for each product code, such as the home page for the product's manufacturer. In this case, the OCR engine of the scanner converts the scanned bar codes into corresponding numerical codes. Upon the transmission of a scanned code from the scanner, the software program agent retrieves an associated address from the database, and then establishes the connection to the appropriate remote site.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A system for automatically connecting a communications device to a remote site identified in printed text, comprising the combination of:

a handheld scanner including a housing adapted to be held in the hand of a user and scanned over a line of printed text, and containing an image scanning device for converting optical images of text scanned by said scanner into electrical signals representative of the optical images, a memory for storing said electrical signals, a character recognition engine for converting said stored electrical signals into data representative of characters of text, a display unit providing a visual display of the characters represented by said data, a wireless transmission device for transmitting said data to said communications device, and a set of user controls for manipulating the display and transmission of said character data; and a software agent that operates on said communications device for receiving the data transmitted from said handheld scanner and controlling said communications device to initiate a connection to a remote site that is identified by the characters of text represented by the transmitted data.

2. The system of claim 1 wherein said communications device includes a central processing unit (CPU), and said software agent further controls said CPU to launch an application program for communicating with the remote site.

3. The system of claim 2 wherein said application program is an internet browser program.

4. The system of claim 1 wherein said software agent is incorporated a browser program.

5. The system of claim 1 wherein said software agent causes data to be retrieved from said remote site and provides said data to an application program that is executing on said communication device.

6. The system of claim 1 wherein said handheld scanner further includes a light emitting device for emitting a line of visible light that is aligned with said image scanning device for guiding the handheld scanner along a desired path of travel during a scanning operation.

7. A handheld scanner for reading information to connect a communications device to a remote site identified in printed text, comprising:

a housing adapted to be held in the hand of a user and scanned over a line of printed text;

an image scanning device for converting optical images of text into electrical signals representative of the optical images;

a light emitting device for emitting a line of visible light that is aligned with said image scanning device for guiding the handheld scanner along a desired path of travel during a scanning operation;

a character recognition engine for converting said electrical signals into data representative of characters of text;

a memory for storing said electrical signals and said data;

a display unit providing a visual display of the characters represented by said data;

a transmission device for transmitting said data to said communications device; and a set of user controls for manipulating the display and transmission of said character data.

8. The handheld scanner of claim 7 wherein said transmission device transmits said data via wireless communications.

9. The handheld scanner of claim 8 wherein said transmission device transmits said data via infrared light signals.

10. The handheld scanner of claim 8 wherein said transmission device transmit said data via rf electrical signals.

11. The handheld scanner of claim 7 wherein said housing further includes a self-contained power supply.

12. A system for automatically connecting a communications device to a remote site identified in printed text, comprising:

a handheld scanner including an image sensing device for converting optical images of scanned symbols into electrical signals, a character recognition engine for converting said electrical signals into data representative of alphanumeric characters, and a transmission device for transmitting said data to said communications device; and a software agent that operates on said communications device, for receiving the data transmitted from said handheld scanner and controlling said communications device to initiate a connection to a remote site that is identified by the alphanumeric characters represented by the transmitted data.

13. The system of claim 12 wherein said software agent further controls said communications device to launch an application program for communicating with the remote site.

14. The system of claim 13 wherein said application program is an internet browser program.

15. The system of claim 12 further including a database stored on said communications device for providing said software agent with address information that corresponds to the remote site identified by character data received from said scanner.

16. The system of claim 12, wherein said software agent is incorporated a browser program.

17. The system of claim 12, wherein said handheld scanner further includes a display device which displays the alphanumeric characters converted by said character recognition engine.

18. The system of claim 17, wherein said scanned symbols comprise textual characters, and said display device displays said textual characters after conversion by said character recognition engine.

* * * * *